United States Patent [19]

Heger et al.

[11] Patent Number: 5,905,455
[45] Date of Patent: *May 18, 1999

[54] DUAL TRANSMITTER VISUAL DISPLAY SYSTEM

[75] Inventors: Charles E. Heger, Saratoga; James C. Long, Sunnyvale; Noel H. C. Marshall, Woodside; Paul W. Dodd, San Jose, all of Calif.

[73] Assignee: Zircon Corporation, Campbell, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/956,920

[22] Filed: Oct. 23, 1997

Related U.S. Application Data

[63] Continuation of application No. 08/514,205, Aug. 11, 1995, abandoned.

[51] Int. Cl.⁶ ..................................................... G01S 13/18
[52] U.S. Cl. ............................... 342/22; 342/142; 367/87; 367/107
[58] Field of Search ................................. 367/87, 95, 99, 367/104, 107, 113, 910; 342/21, 22, 138, 142, 144; 73/625, 628; 324/67, 329

[56] References Cited

U.S. PATENT DOCUMENTS

| | | | |
|---|---|---|---|
| 3,222,634 | 12/1965 | Foster | 367/113 |
| 3,267,417 | 8/1966 | Galloway | 367/113 |
| 3,278,843 | 10/1966 | Deming | 324/61 |
| 3,569,971 | 3/1971 | Griffee | 343/725 |
| 3,710,387 | 1/1973 | Hinchman et al. | 343/12 R |
| 4,011,750 | 3/1977 | Robinson | 73/628 |
| 4,015,264 | 3/1977 | Koerner | 343/725 |
| 4,041,382 | 8/1977 | Washburn | 324/65 R |
| 4,067,225 | 1/1978 | Dorman et al. | 73/1 DV |
| 4,072,942 | 2/1978 | Alongi | 343/5 NA |
| 4,086,528 | 4/1978 | Walton | 324/61 R |
| 4,109,255 | 8/1978 | Silliman | 343/853 |
| 4,125,835 | 11/1978 | Barry | 343/13 R |
| 4,130,796 | 12/1978 | Shum | 324/61 R |
| 4,151,415 | 4/1979 | Lipke | 250/33 |
| 4,319,247 | 3/1982 | Warren | 343/17.7 |
| 4,322,678 | 3/1982 | Capots et al. | 324/61 R |
| 4,464,622 | 8/1984 | Franklin | 307/592 |
| 4,636,996 | 1/1987 | Tsuji | 367/909 |
| 4,658,385 | 4/1987 | Tsuji | 367/105 |
| 4,676,100 | 6/1987 | Eichberger | 73/304 C |
| 4,706,031 | 11/1987 | Michiguchi et al. | 342/22 |
| 4,728,952 | 3/1988 | Richmond | 342/91 |
| 4,730,190 | 3/1988 | Win et al. | 342/118 |
| 4,847,552 | 7/1989 | Howard | 324/67 |
| 4,853,617 | 8/1989 | Douglas et al. | 324/67 |
| 4,896,116 | 1/1990 | Nagashima et al. | 324/329 |

(List continued on next page.)

FOREIGN PATENT DOCUMENTS

WO 94/06121 3/1994 WIPO.

*Primary Examiner*—Ian J. Lobo
*Attorney, Agent, or Firm*—Skjerven, Morrill, MacPherson, Franklin & Friel LLP; Norman R. Klivans

[57] ABSTRACT

A cost-effective wideband radar system capable of locating objects, such as reinforcing steel rods, pipes, and air bubbles, objects located behind or within a volume of, e.g., concrete, soil, wood, or air. A sequence of wideband radar pulses are emitted without a carrier from each of two transmit antennas. The system includes a receiver that detects reflected pulse energy (echoes) that result when transmitted pulses encounter a change in material (e.g., an air to metal change or concrete to metal change). These amplitudes of the echoes are visually displayed along with the length of the transmit/echo path for each transmitter. The lengths of the displayed transmit/echo paths are compared to determine whether the system is centered over an object located within or behind a volume, the system being centered over the object when the transmit/echo paths for each transmitter/receiver combination are of equal length.

15 Claims, 10 Drawing Sheets

U.S. PATENT DOCUMENTS

| | | | |
|---|---|---|---|
| 4,939,455 | 7/1990 | Tsugawa | 324/168 |
| 4,947,116 | 8/1990 | Welcome et al. | 324/173 |
| 4,992,741 | 2/1991 | Douglas et al. | 324/671 |
| 5,023,484 | 6/1991 | Pathak et al. | 307/465 |
| 5,023,594 | 6/1991 | Wallace | 340/552 |
| 5,089,704 | 2/1992 | Perkins | 250/342 |
| 5,148,175 | 9/1992 | Woolfolk | 342/95 |
| 5,164,703 | 11/1992 | Rickman | 340/515 |
| 5,196,826 | 3/1993 | Whiting | 340/554 |
| 5,274,271 | 12/1993 | McEwan | 307/108 |
| 5,332,938 | 7/1994 | McEwan | 307/572 |
| 5,345,471 | 9/1994 | McEwan | 375/1 |
| 5,352,974 | 10/1994 | Heger | 324/67 |
| 5,361,070 | 11/1994 | McEwan | 342/21 |
| 5,381,151 | 1/1995 | Boles et al. | 342/21 |
| 5,457,394 | 10/1995 | McEwan | 324/642 |
| 5,541,605 | 7/1996 | Heger | 342/85 |
| 5,543,799 | 8/1996 | Heger | 342/85 |

DUAL TRANSMITTER VISUAL DISPLAY SYSTEM

CROSS-REFERENCE TO RELATED APPLICATIONS

This application is a continuation of application Ser. No. 08/514,205, filed Aug. 11, 1995, now abandoned.

The present application is related to U.S. Pat. No. 5,543,799 issued Aug. 6, 1996 to Heger and U.S. Pat. No. 5,640,168 issued Jun. 17, 1997 to Heger et al., both of which patents are incorporated herein by this reference.

BACKGROUND OF THE INVENTION

1. Field of the Invention

This invention relates to detection systems, and more specifically to an inexpensive short-range detection system for locating reinforcing steel rods, pipes, and other nearby objects positioned behind or within a volume of, e.g., concrete, soil, or wood.

2. Description of Related Art

A requirement exists for a cost-effective system capable of locating reinforcing steel rods (rebar), pipes, bubbles, and other objects buried in concrete or soil, or hidden behind walls or other structures. Various devices and systems currently exist to locate these various objects, but all are either limited in capability or very costly.

To overcome disadvantages of other available systems, Zircon Corporation of Campbell, Calif., developed an improved radar system for locating objects behind or within a volume of material. That radar system, described in the above-incorporated U.S. Pat. No. 5,543,799 entitled "Swept Range Gate Radar System for Detection of Nearby Objects," relates to the ultra-wide band (UWB) radar technology developed by the Lawrence Livermore National Laboratory (LLNL). (For more information on the UWB radar technology developed by the LLNL, see U.S. Pat. No. 5,457,394 issued Oct. 10, 1995 entitled Impulse Radar Studfinder, U.S. Pat. No. 5,361,070 issued Nov. 1, 1994 entitled Ultra-Wideband Radar Motion Sensor, and U.S. Pat. No. 5,345,471 issued Sep. 6, 1994 entitled Ultra-Wideband Receiver, all issued to McEwan and are incorporated by reference.

The radar system described in the above-referenced Zircon patent application transmits a pulse and senses a return echo. The radar system then provides indications of (1) the strength of the return echo, and (2) the time lapse between transmitting the pulse and receiving the return echo. The strength of the return echo provides an indication of the size and material of the object reflecting the signal, while the time lapse provides an indication of the distance (i.e., range) between the radar system and the object.

The aforementioned radar system is contained in a radar unit that may be moved over a surface of a volume of material to determine the presence and location of objects within or behind the volume (e.g., reinforcing steel, such as "rebar," may be located within a concrete wall). All physical movement of the radar unit over the surface being scanned is performed by a human operator, with any given display presentation being uniquely associated with a given position of the unit on the surface. Thus, the operator has physical control of the X and Y coordinates (i.e. the surface of the volume being scanned), while the radar unit scans into the volume along a Z axis normal to the surface. Any change in amplitude on the display can now be associated with a particular point within the volume of the object, the point being uniquely specified by X, Y, and Z coordinates. In addition, the amplitude of the echo gives an indication of the size and material of the object from which the pulse is reflected.

Figure 1A:
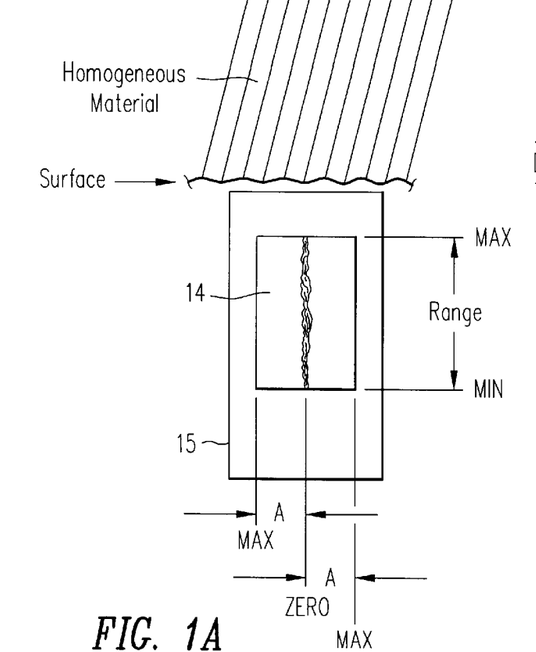
FIGS. 1A, 1B, 1C, and 1D show examples of a display corresponding to particular detection situations in accordance with a single-transmit-antenna radar system.

FIGS. 1A, 1B, 1C, and 1D show a planar graphics display 14 with several exemplary display examples. FIG. 1A depicts a planar graphics display that has two axes of information: range (Min to Max) and amplitude A (zero to Max on either side of the centerline). The display 14, as physically attached to the unit, is typically parallel to the surface being scanned when the unit 15 is in use. The display 14 thus provides a representation of the cross-section of the volume being scanned at that physical location on the surface. The display of amplitude information is in one embodiment "mirror imaged" about the center line shown to eliminate any X-Y bias.

In FIG. 1A, the volume being scanned contains only homogeneous material within the scan range of the unit. Thus, display 14 provides no indication of a subsurface object.

Figure 1B:
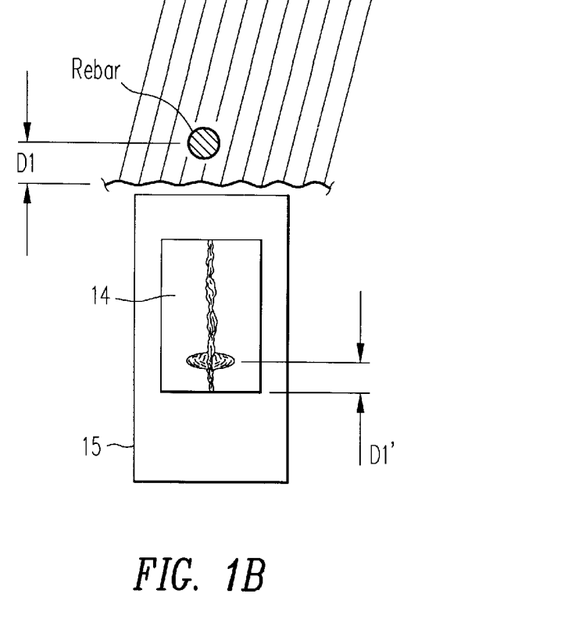
Figure 1C:
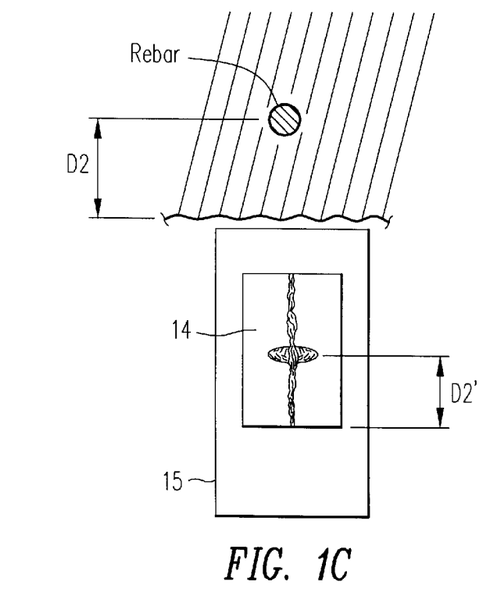

FIG. 1B shows the detection of metal rebar at depth D1 into the volume and depicted on the display at position D1' indicating the depth. FIG. 1C is similar to FIG. 1B, but with the rebar at a greater depth D2, shown on display 14 at position D2'.

Figure 1D:
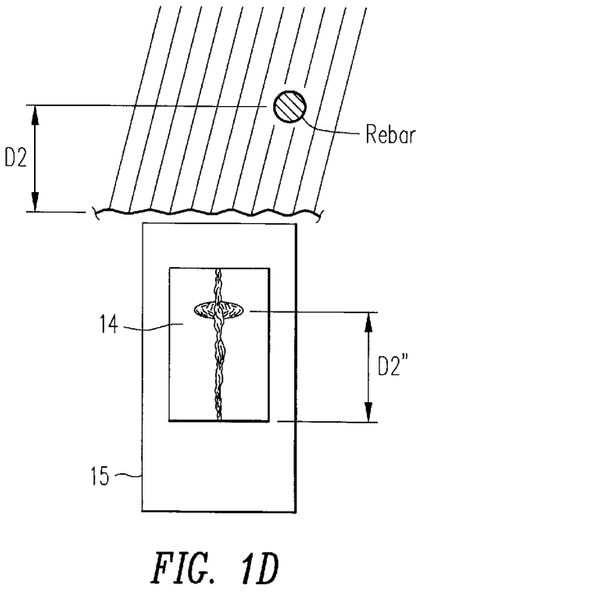

FIG. 1D illustrates a possible source of error in the radar system of unit 15. In FIGS. 1B and 1C, the unit 15 was centered below the rebar, thus giving an accurate measure of the respective depths D1 and D2. In contrast, FIG. 1D shows a case where the unit 15 is not centered above the rebar, and therefore gives an erroneous indication of the depth D2.

The depth D2 is the same in FIGS. 1C and 1D. However, because the offset of FIG. 1D increases the distance traveled by the pulse, the measured depth D2" of the unit 15 in FIG. 1D is greater than the true measured depth D2' of FIG. 1C. To achieve an accurate measure of depth and to properly center the unit 15, the operator must move the unit 15 across the surface until the depth reading is minimized.

Unfortunately, it can be difficult to precisely determine the point at which the distance measurement is minimized, and therefore to determine when the unit 15 is centered on the object being located (e.g., the rebar). Moreover, the process of centering becomes more difficult as the depth of the object increases. Therefore, a radar unit that is more easily centered over subsurface objects, thereby allowing a user to locate such objects with greater precision, would be advantageous.

SUMMARY

The present invention is directed to a detection display that satisfies the need for an easily-centered detection system that allows a user to precisely locate e.g. subsurface objects.

A system in accordance with the present invention transmits one or more pulses along at least two transmit/echo paths, each transmit/echo path being defined by a transmitter, a receiver, and a target. A transmit/echo path is defined when a transmitter transmits one or more pulses that are reflected from the target to a receiver. Two transmit/echo paths may be defined by a single transmitter and two receivers, two transmitters and a single receiver, or two transmitters and two receivers.

One or more receivers receive the pulses reflected from the target and provide, for each transmit/echo path, information corresponding to the amplitude of the reflected pulses and the length of the transmit/echo path (i.e., the distance travelled by a transmitted pulse before the reflected pulse is received). The amplitude and length information for each transmit/echo path is then conveyed to a display that provides an intuitively understood display of the amplitude and path length information for each path.

The transmit and receive antennas are arranged such that the length of each transmit/echo path is equal when the system is centered over the target. Thus, the system is easily centered over the target by manipulating the antennas over the target area until the transmit/echo path lengths, as displayed, are equal.

DETAILED DESCRIPTION

Figure 2:
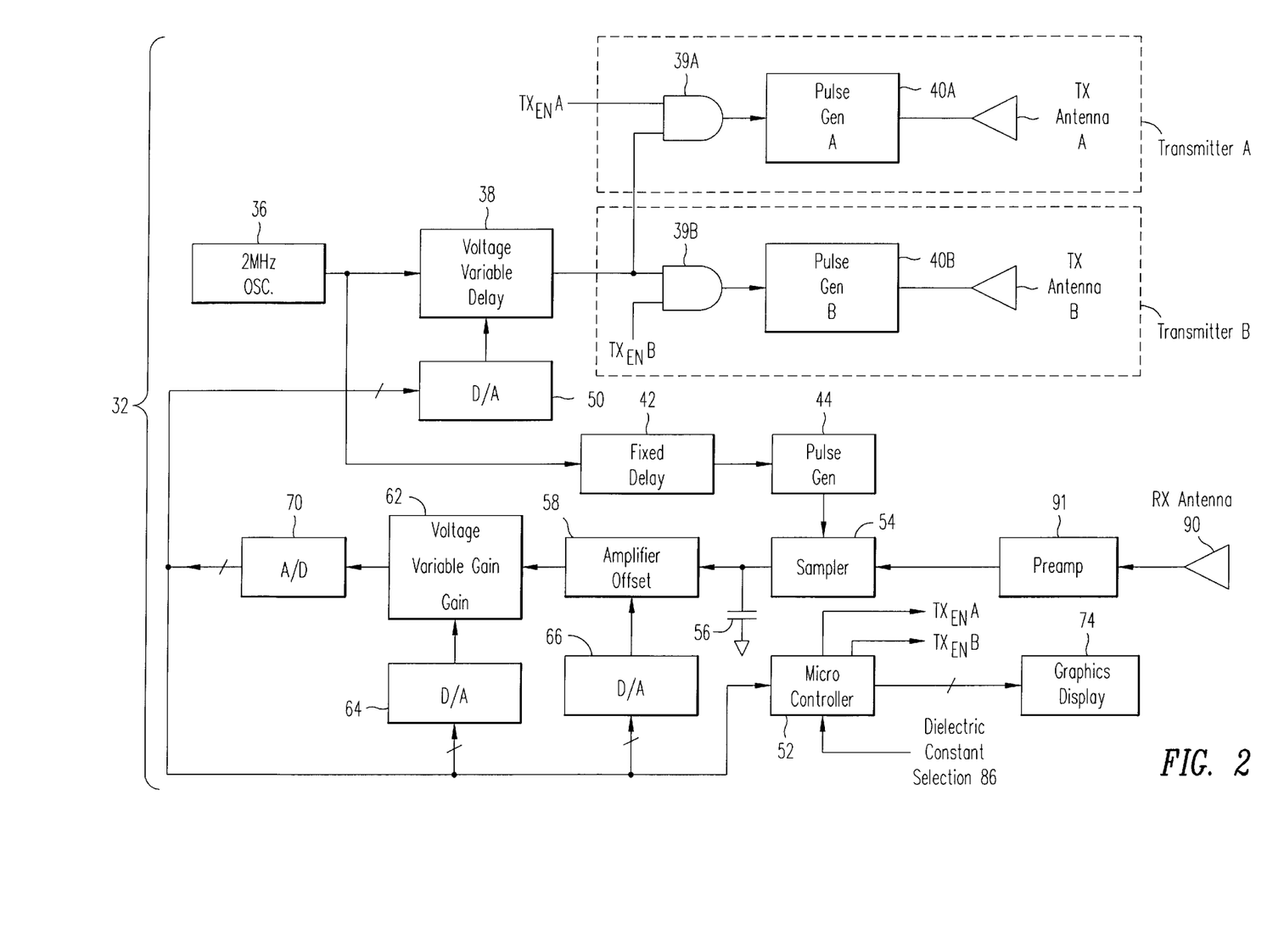
FIG. 2 shows a block diagram of a swept-range-gate, ultra-wideband radar system in accordance with the present invention.

The various features in accordance with the invention as described above may be accomplished by a combination of analog and/or digital circuitry and/or software executed e.g. in a microprocessor. FIG. 2 shows one embodiment of a wideband radar unit 32 that includes these features.

A 2 MHz master oscillator 36 drives two paths: a first path to a voltage-controlled variable delay circuit 38 and then to a pair of transmitters, transmitters A and B, and a second path through a fixed delay circuit 42 and then to the receive pulse generator 44. The fixed delay circuit 42 is similar to variable delay circuit 38, without the variable elements.

AND gates 39A and 39B receive input signals on terminals $TX_{EN}A$ and $TX_{EN}B$ from microcontroller 52 that allow a pulse generator 40A and a pulse generator 40B to be time-division multiplexed. When the logic level from microcontroller 52 on a transmit enable terminal $TX_{EN}A$ is one (e.g., five volts), AND gate 39A passes the output of voltage variable delay 38 to pulse generator 40A. On the other hand, when the logic level from microcontroller 52 on transmit enable terminal $TX_{EN}B$ is one, AND gate 39B passes the output of voltage variable delay 38 to pulse generator 40B. Microcontroller 52 only provides an enabling voltage (i.e., a logic one) to only one of transmit enable terminals $TX_{EN}A$ and $TX_{EN}B$ at a time so that only one of pulse generators 40A and 40B receives a signal from voltage variable delay 38. In this way, each of transmitters A and B is enabled approximately fifty percent (50%) of the time.

Either of transmitters A and B, when activated, can transmit from one to many thousands of pulses before the transmit activity is switched to the other pulse generator. Typically, from approximately 1000 to 10,000 pulses are emitted by one of transmitters A and B before that transmitter is disabled and the other enabled. Each pulse has a typical pulse width of approximately 100 to 300 picoseconds.

Figure 3:
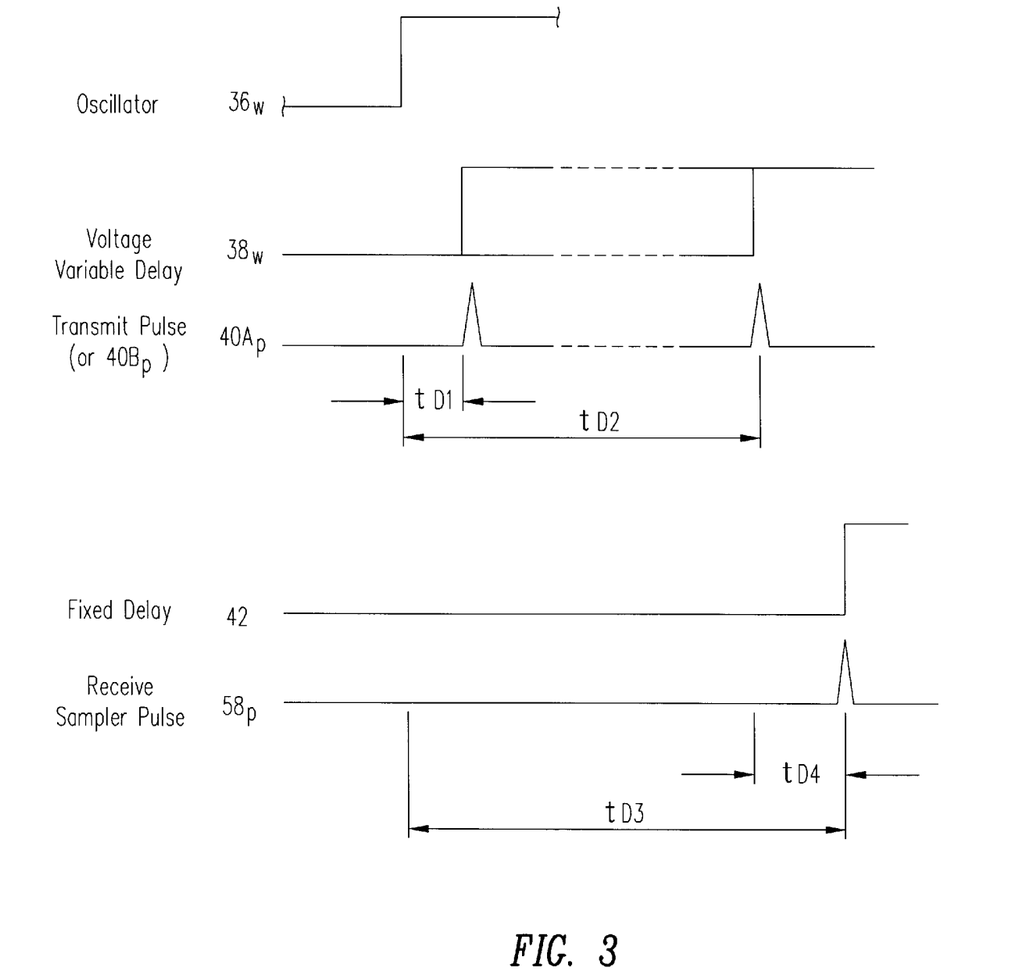
FIG. 3 shows waveforms illustrating the swept-range-gate system timing of the system of FIG. 2.

The voltage-controlled variable delay 38 allows changing the time of the transmit pulse with respect to the receive pulse generator 44, with a digital-to-analog converter (D/A) 50 providing a varying voltage under control of a conventional microcontroller 52. This structure then generates a continuously-changing time delay from some minimum to maximum delay time, creating the swept range. A typical sweep frequency is 100 Hz. The fixed delay 42 in the receiver path is set equal to or greater than the maximum transmit delay of voltage variable delay 36. The timing relationship of the transmit pulse generator 40 and receive pulse generator 44 then determines the range of distances over which unit 32 will scan. FIG. 3 depicts this timing by waveforms showing the output signals of various portions of unit 32.

In contrast to the present radar system in which the transmit pulse time is varied and the receive pulse time is fixed, conventional radar systems use a fixed transmit pulse time and vary the receiver pulse time. (The conventional configuration may be utilized for the present invention but is not preferred.) Sweeping the receive delay conventionally has been found to create additional background clutter due to extraneous signal coupling in the presence of high gain amplifiers and "droop" on the sampler hold capacitor 56, undesirably creating a phase-modulated replica of the range sweep control voltage. These disadvantages are eliminated when the transmit pulse is varied instead.

With reference to FIG. 3, times $t_{D1}$ and $t_{D2}$ are the minimum and maximum respectively of the transmit voltage-controlled pulse delay 38. The receive pulse delay 42 is fixed at $t_{D3}$. Thus, the minimum range is set by $t_{D3}-t_{D2}=t_{D4}$ (which could be equal to zero). The maximum range is $t_{D3}-t_{D1}$. The transmit delay can be any value between these limits as defined by the microcontroller 52 via the D/A 50 driving the voltage variable delay circuit 38.

In operation, when the delay between the generation of a transmit pulse (e.g., $40A_p$ of FIG. 3) and the generation of a receive pulse (e.g., $58_p$ of FIG. 3) is equal to the round-trip transit time of the transmit pulse reflecting off a target, the receive sampler 54 will be turned on coincident with the arrival of the return echo through a receive antenna 90 and a conventional preamplifier 91, and the sampled and held signal is amplified by amplifier 58.

Prior to any actual sensing, a calibration process is performed to remove the background "clutter." At each finite range gate control voltage from D/A 50, with the gain of voltage variable gain circuit 62 set via D/A 64 to a previously determined setting, offset D/A 66 driving the offset voltage control of amplifier 58 is varied with a successive approximation routine (or other search routine resident in microcontroller 52) until the output of A/D 70 is at midrange. The offset binary number (value) driving offset D/A 66 is then stored in microcontroller 52 memory and the range gate D/A 50 is stepped to the next value along with the appropriate gain control D/A 64 binary number (value). The offset D/A 66 search routine is repeated and the number saved. This process is repeated until all range gate control settings have been processed in this manner. (It is to be understood that writing a software routine carrying this out via microprocessor/microcontroller 52 is well within the ability of one of ordinary skill in the art.) The variable gain circuit 62 is any circuit for varying a gain by a voltage control. The unit 32 must be-physically stable with relationship to a surface or pointed into the surface as this routine is performed. (This calibration process is applicable, with appropriate readily apparent modifications, to an UWB radar system where the receiver is range swept rather than the transmitter.)

After initial calibration, normal operation can commence. At each range gate D/A 50 setting, the offset D/A 66 and gain D/A 64 settings associated with this range are recalled by the microcontroller 52. With no echo at any range setting, the output of A/D (analog to digital converter) 70 will always be at mid-scale, as any previous background is subtracted out by the offset D/A 66. If, however, an echo is present representing a target at some given distance and range gate setting, the A/D 70 output will not be mid-scale but some other value. This difference from mid-scale is then processed by the microcontroller 52 and displayed on graphics display 74, which may be an LCD or other conventional display.

It is important to note that while the inventive radar system is described as making use of time-division multiplexing to enable the use of multiple antennas, other embodiments of the invention may not use time-division multiplexed transmitters, but instead may use other conventional methods of separating the response from multiple transmitters. For example, separate transmitters, operating with different transmit frequencies, may have dedicated receivers configured to receive particular frequencies. Alternatively, coded transmissions may be used.

Figure 4A:
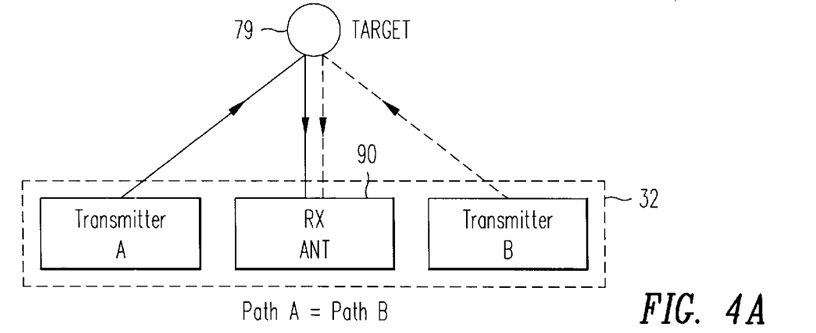
FIGS. 4A, 4B, 4C, and 4D show the effect on the transmit/echo path length of moving the detection system relative to a target.
Figure 4B:
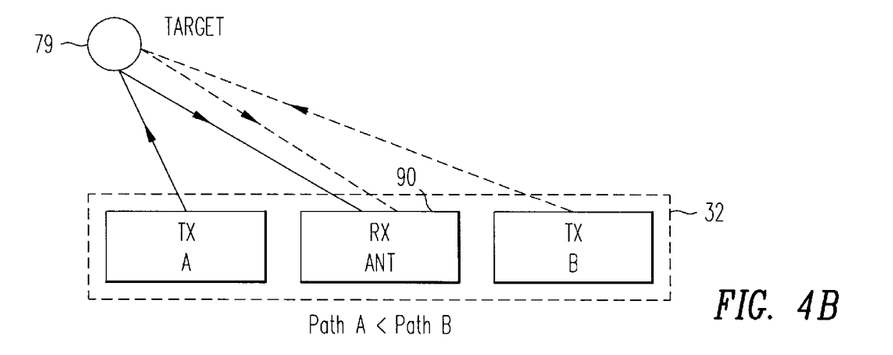
Figure 4C:
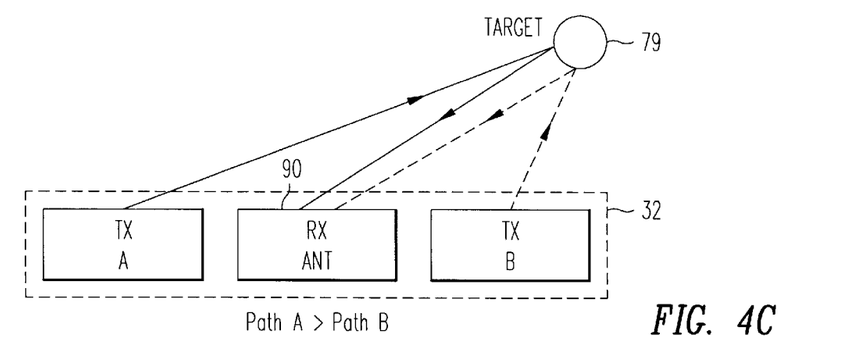

FIG. 4 shows three unit/target scenarios—when a target 79 is on the centerline (mean) of the two transmit/echo paths of unit 32 (FIG. 4A) and when the target 79 is to the left and right of the central path axis of unit 32 (FIGS. 4B and 4C).

Note that in FIG. 4A the length of the transmit/echo path of transmitter A is equal to the transmit/echo path of transmitter B (designated by a dotted line). But, when target 79 is displaced to the left, as shown in FIG. 4B, the transmit/echo path of transmitter B is longer than the transmit/echo path of transmitter A. Conversely, when the target 79 is displaced to the right, as shown in FIG. 4C, the transmit/echo path of transmitter A is longer than the transmit/echo path of transmitter B. Increasing the distance separating transmitter A from transmitter B enhances this effect.

For each of transmitters A and B, A/D 70 outputs a number related to the strength of the echo from that transmitter. In addition, unit 32 uses the timing of each echo to determine the length of the transmit/echo path for each of transmitters A and B. Thus, display 74 has two pieces of information to visually display for each of transmitters A and B: amplitude and range.

All physical movement of the unit 32 over the surface being scanned is done by the operator, with any given display presentation being uniquely associated with a given position of the unit on the surface. Thus, the operator has physical control of the X and Y coordinates (i.e. the surface being scanned) and the unit 32 scans into the surface along an axis normal to the surface. ("Surface" need not be a structure per se but could be merely the surface of unit 32 where it is in contact with the air.) Any change in amplitude on the display can now be associated with a unique X, Y, and Z coordinate within the volume of the object being scanned, with the amplitude of the return signals giving an indication of the size and material of objects buried/hidden within or behind the object.

Figure 4D:
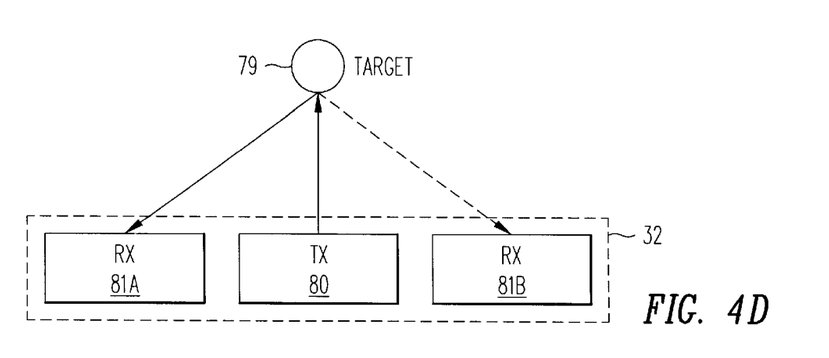

FIG. 4D, like FIG. 4A, shows the case in which target 79 is on the centerline (mean) of two transmit/echo paths of a detection unit. However, instead of using two transmitters and a single receiver as shown in unit 32 of FIG. 4A, the embodiment of FIG. 4D defines the two transmit/echo paths using a single transmitter 80 and a pair of receivers 81A and 81B.

A detection system in accordance with the embodiment of FIG. 4D functions in substantially the same way as unit 32 of FIG. 2. However, unit 32 is modified to support the use of a single transmitter and two receivers. For example, the circuit of FIG. 2 is modified to eliminate transmitter B and to include a second receive antenna, a second preamplifier, and a second sampler. The output of the second sampler is multiplexed with the output of sampler 54 to the input of amplifier 58. Other embodiments of the single transmitter system of FIG. 4D may not use time-division multiplexed transmitters, but instead may use other conventional methods of separating the response from multiple receivers.

In another embodiment, the need for multiplexing is eliminated through the use of a pair of transmitters and a pair of receivers to define two transmit/echo paths. Of course, this embodiment requires an additional antenna.

Figure 5A:
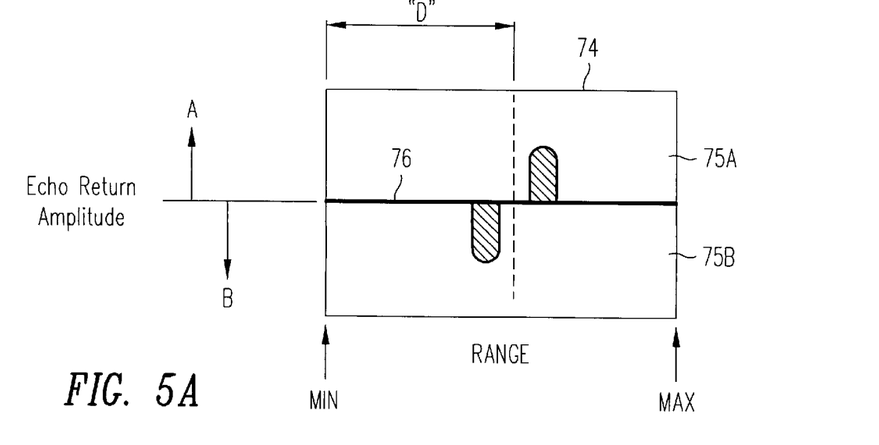
FIGS. 5A, 5B, and 5C depict a planar graphics display as an example of display 74 of FIG. 2.
Figure 5B:
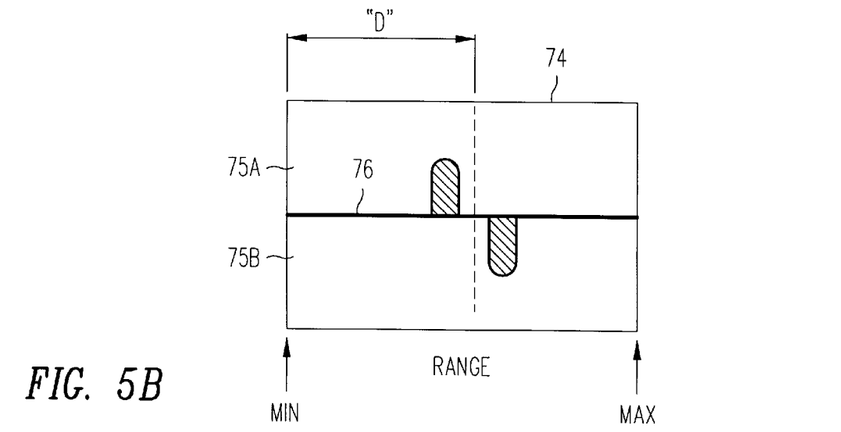
Figure 5C:
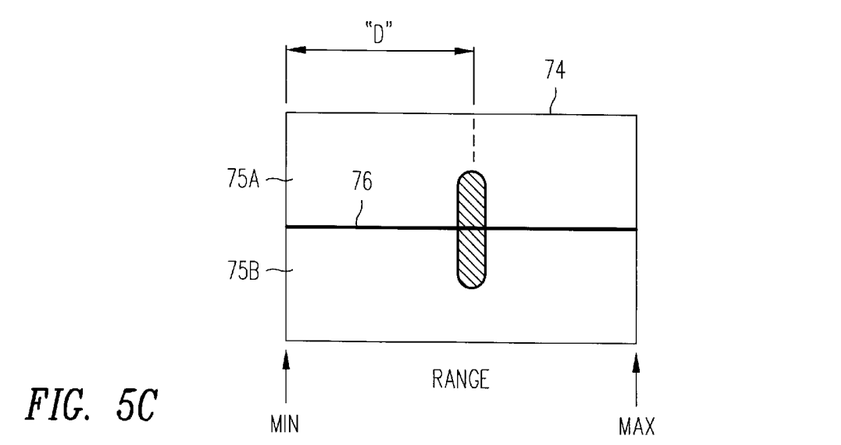

FIGS. 5A, 5B, and 5C depict a planar graphics display as an example of display 74 of FIG. 2. A graphics LCD module or equivalent display is used as graphics display 74 to display the two channels of information provided by transmitters A and B. In one embodiment, display 74 is a planar graphics display available from Hyundai as part number HG12602N6-EW, which has a resolution of 64 by 128 pixels.

As shown in FIG. 5A, display 74 has two axes. The horizontal axis displays range (Min to Max), and the vertical axis displays amplitude. Display 74 is divided horizontally by a horizontal center line 76 into an upper half 75A and lower half 75B. Horizontal center line 76 then represents zero amplitude for both channels of information provided by transmitters A and B. The amplitudes of echoes created by transmitter A are displayed in the upper half 75A, the amplitudes displayed as extending up from the center line 76. Conversely, echoes created by transmitter B are displayed as extending down from the center line 76. The display 74, as physically attached to the unit, is orthogonal to the surface being scanned when the unit 32 is in use, and thus provides a representation of the cross-section of the volume being scanned at that physical location on the surface.

If the target 79 is directly in front of the unit 32 and on a line orthogonal to the antenna radiating surface that bisects the receive antenna 90, then the transmit/echo path length from transmitter A to receive antenna 90 is equal to the transmit/echo path length from transmitter B to receive antenna 90, as shown in FIG. 4A. The display, as in FIG. 5C, will then indicate two pulses, one from each transmit path, that are vertically aligned with respect to each other and that occur at a certain range along horizontal center line 76, as indicated by the distance "D" from the minimum range point on the display (far left vertical edge) to where the pulses are displayed.

As unit 32 is moved laterally away, either to the left or right, from the position of FIG. 4A (as displayed in FIG. 5C), the lengths of the two transmit/echo return paths will change, one increasing and the other decreasing, as depicted by display 74 in FIGS. 5A and 5B.

Figure 6:
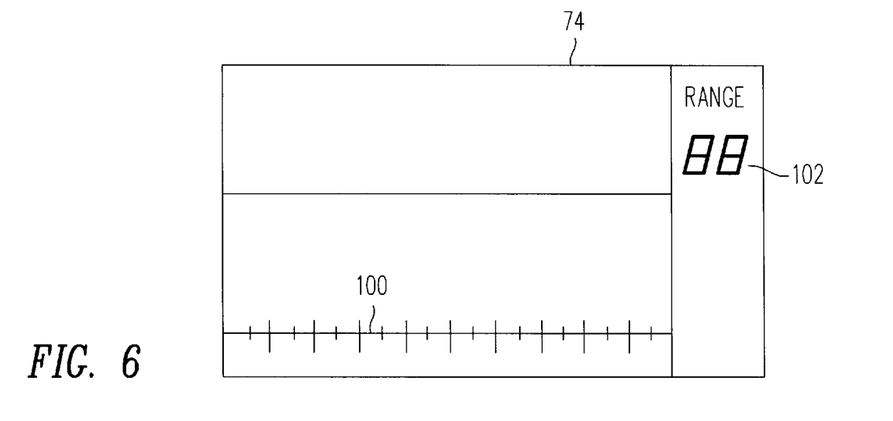
FIG. 6 shows a horizontal scale 100 or a numeric display for indicating target range.

In use, the unit 32 is then moved laterally left and right until the target pulses are vertically aligned on the display as shown in FIG. 5C. As shown in FIG. 6, the range can then be read from, for example, a horizontal scale 100 or a displayed numeric value 102. As stated above with respect to FIG. 4, increasing the distance separating transmitter A from transmitter B enhances the relative transmit/echo path changes that occur when the unit 32 is moved laterally. This enhancement improves the resolution of the unit 32, thereby making it easier for the user to locate a target. However, the separation of transmit antennas A and B must be limited to provide a unit 32 of reasonable size. In a preferred embodiment, transmit antennas A and B are equally spaced on either side of receive antenna 90 and have a center-to-center separation of approximately four inches.

The display 74 may also be used to display additional information about the target 79. For example, the phase of the echo may provide information as to the relative dielectric constants $e_R$ of the target material and the medium in which the target is located. Assuming, for example, that the target material has a dielectric constant that is greater than the medium in which the target is located, the echo will be 180° out of phase with respect to the transmitted pulse. If, on the other hand, the dielectric constant of the target material is less than that of the medium, the echo will be in phase with the transmitted pulse. Thus, the relative phases of the transmitted pulse and the resulting echo may be advantageously used to differentiate between, for example, an air-filled plastic pipe and a piece of rebar while both objects are embedded in a volume of concrete.

Figure 7A:
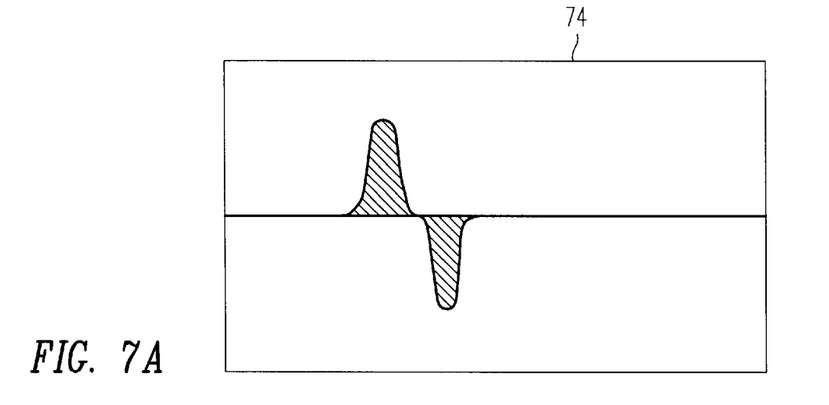
FIGS. 7A and 7B show a display for differentiating target materials based on the relative dielectric constants of the target material and the material in which the target is located.
Figure 7B:
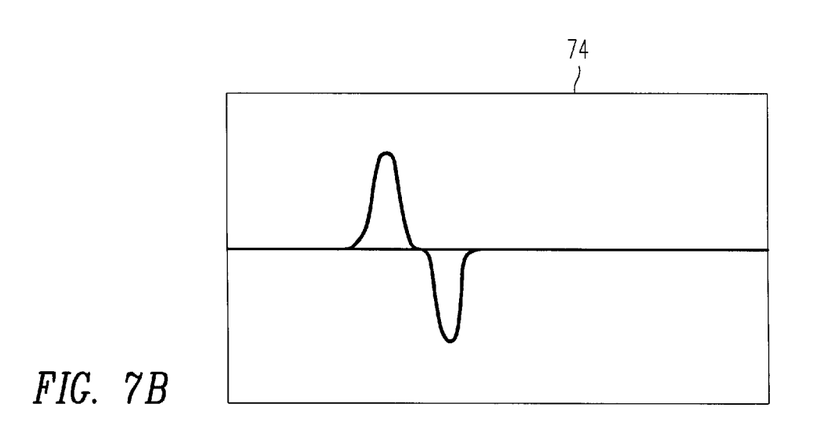

In one embodiment of the invention, display 74 is configured to display the additional phase information described above. The display 74 displays the phase information in a very intuitive manner. Objects that have a dielectric constant greater than that of the material in which they are contained, for example rebar in a volume of concrete, are displayed as filled-in (solid) pulses, as shown in FIG. 7A. Objects that have a dielectric constant less than that of the material in which they are contained, for example an air bubble or an air-filled plastic pipe in a volume of concrete, are displayed as hollow pulses, as shown in FIG. 7B.

Figure 8A:
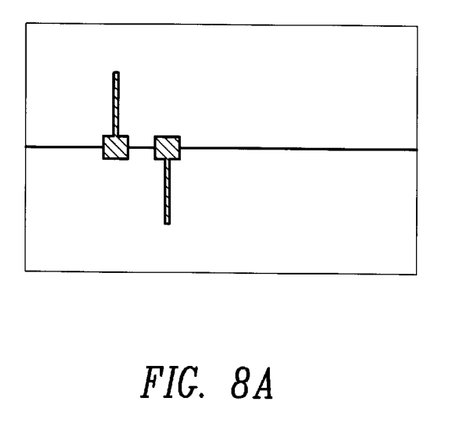
FIGS. 8A and 8B show a second display for differentiating target materials based on the relative dielectric constants of the target material and the material in which the target is located.
Figure 8B:
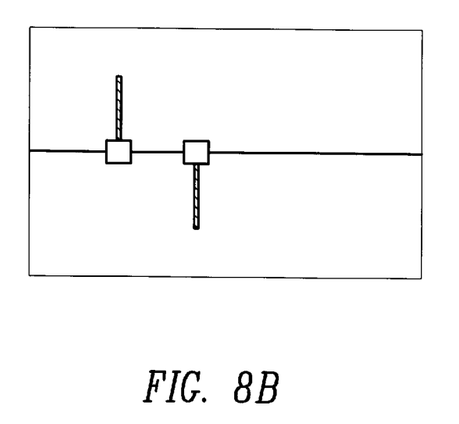

Vary narrow echo pulses may be displayed as vertical lines having widths of only one or two pixels. In such cases, a variation on the hollow versus solid display concept could be used to differentiate materials. For example, as shown in FIGS. 8A and 8B, a box icon may be graphically associated with any particular display echo pulse to provide the same information as do the pulse displays of FIGS. 7A and 7B. Of course, other icons or indicators may be used to provide an indication of the relative values of the dielectric constants of the target and the medium.

Figure 9:
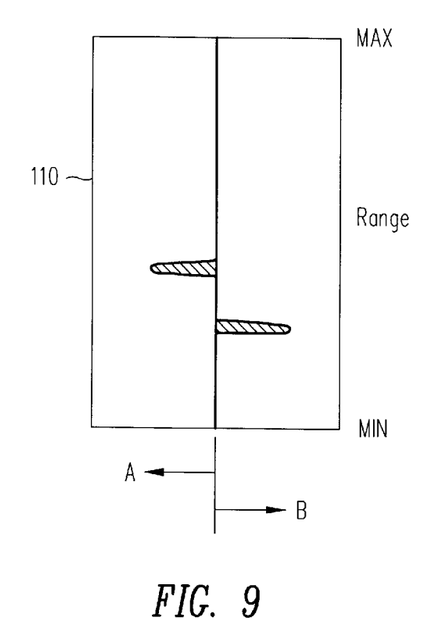
FIG. 9 shows a display that may be used as display 74 and that is split horizontally.

FIG. 9 shows a display 110 that may be used in place of display 74, wherein the display 110 is split vertically, as opposed to the horizontally-split displays of FIGS. 5, 6, 7, and 8.

Figure 10A:
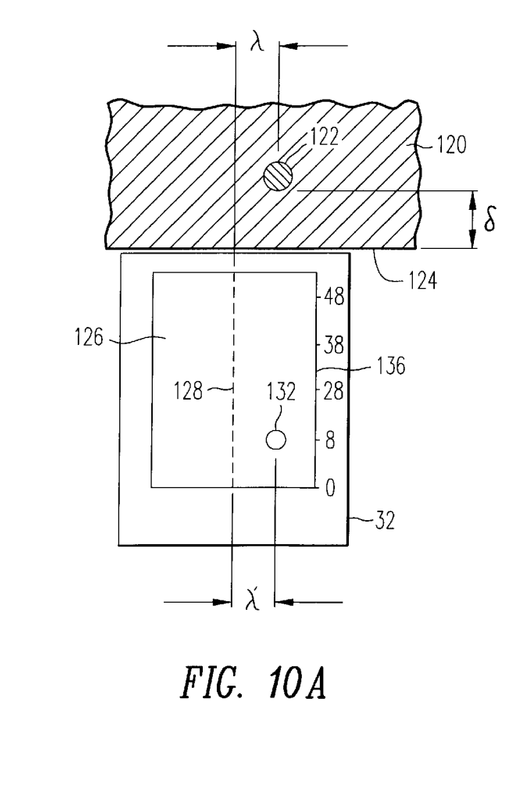
FIGS. 10A, 10B, and 10C show an embodiment of radar unit 32 positioned against a cement wall 120.
Figure 10B:
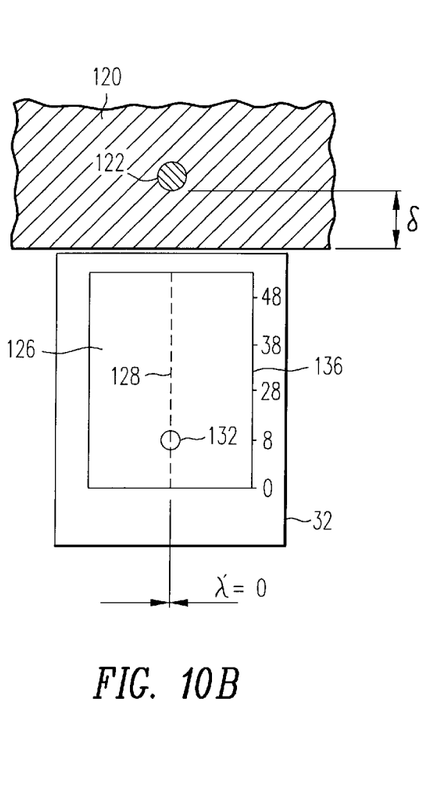
Figure 10C:
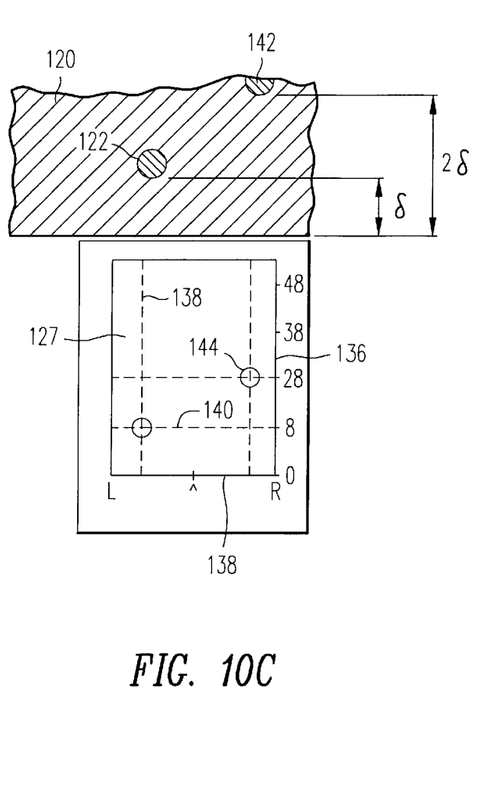

FIGS. 10A, 10B, and 10C show another embodiment of radar unit 32 positioned against a cement wall 120. Cement wall 120 is shown (in cross section) to include a section of rebar 122 located at a distance δ from a surface 124 of cement wall 120.

As shown in FIG. 10A, radar unit 32 has a display 126 that includes vertical and horizontal axes. The vertical axis displays range (e.g., the distance δ) on a scale 136. The horizontal axis displays a left or right offset λ, where offset λ is the distance that a center line 128 is offset from a position directly below rebar 122. For example, offset λ (and, consequently, the measured offset λ') are equal to zero when center line 128 is directly below rebar 122, as shown in FIG. 10B.

As shown in FIG. 10A, the intuitive display 126 displays an icon 132 representing the position of rebar 122 (or other subsurface structure) relative to radar unit 32. Radar unit 32 may be configured such that when center line 128 is horizontally offset from rebar 122 by a distance λ, icon 132 is horizontally offset from center line 128 a distance λ' that is equal to the actual offset λ of rebar 122. Thus configured, display 126 shows the actual left/right offset of the rebar with respect to the center of unit 32. The correct positioning of icon 132 on display 126 is calculated in microcontroller 52, and is a function of distance δ and the difference between the lengths of the two transmit/echo paths of unit 32 (see, for example, FIGS. 4A, 4B, 4C, and 4D). It is to be understood that writing a software routine carrying this out via microcontroller 52 is well within the ability of one of ordinary skill in the art.

To locate rebar 122, radar unit 32 is placed against cement wall 120 and then moved laterally left or right until icon 122 intersects center line 128. As shown in FIG. 10A, the range can then be read from, for example, a scale 136. Of course, display 126 may also include a numeric range display (not shown). Moreover, icon 132 may be shown as hollow or solid to display phase information as described above in connection with FIGS. 7B and 8B.

FIG. 10C shows a modified display 127. Center line 128 of FIGS. 10A and 10B is replaced with a moving vertical line 138 that tracks the position of icon 132, allowing a user to easily read the left/right position of icon 132 (and thus the left/right position of rebar 122) from a left/right scale 138. A moving horizontal line 140 similarly tracks the position of icon 132, allowing a user to easily read the distance δ on vertical scale 136.

Display 126 of FIGS. 10A and 10B and display 127 of FIG. 10C are well adapted for use in locating more than one object behind or within a volume. For example, FIG. 10C shows cement wall 120 including a second section of rebar 142 represented on display 127 by a second icon 144. Using display 127, a user may easily determine the positions of rebar 122 and 142 relative to radar unit 32 and relative to one another.

Figure 11A:
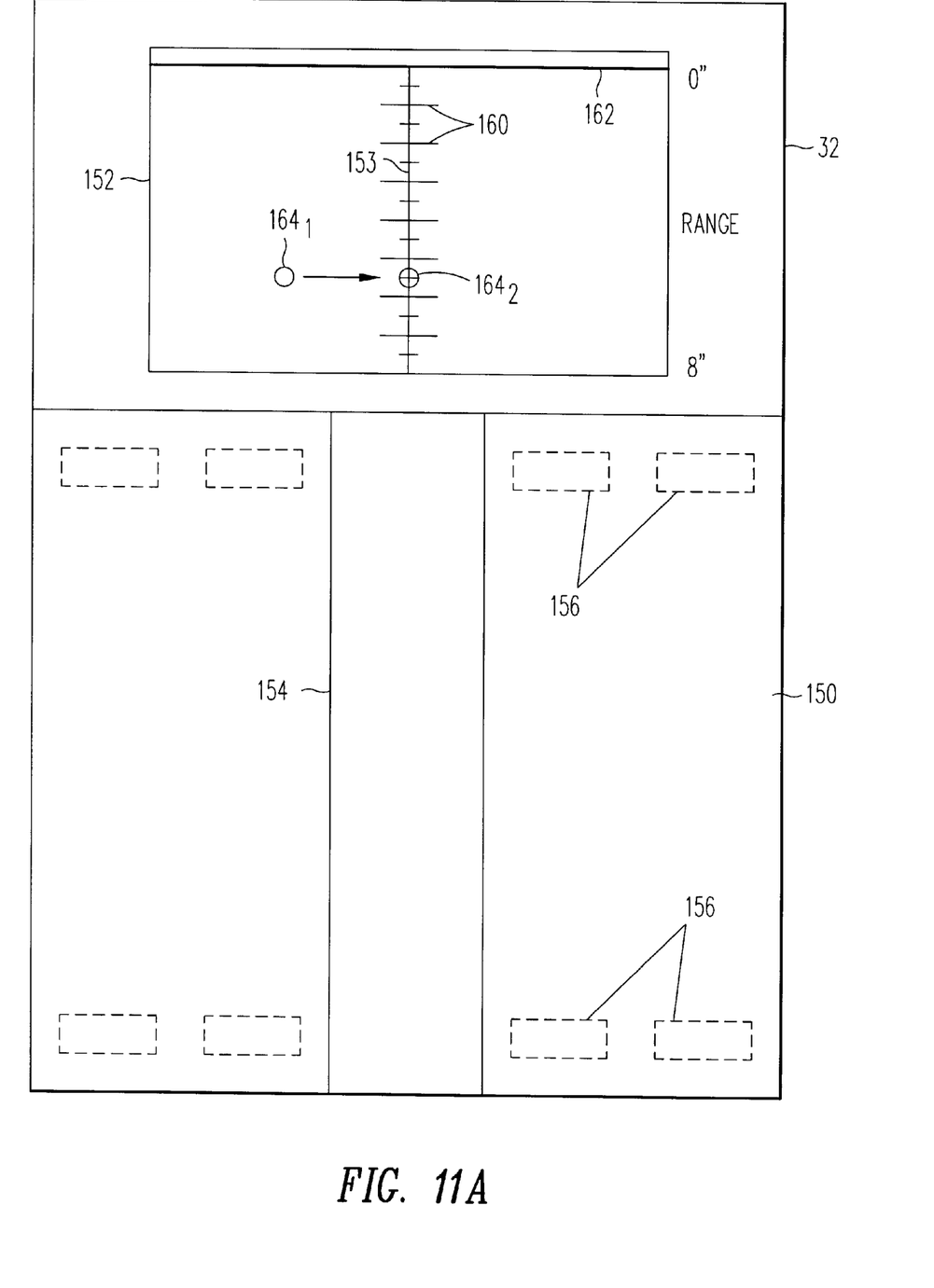
FIGS. 11A and 11B show a hand-held radar unit 32 in accordance with the present invention.
Figure 11B:
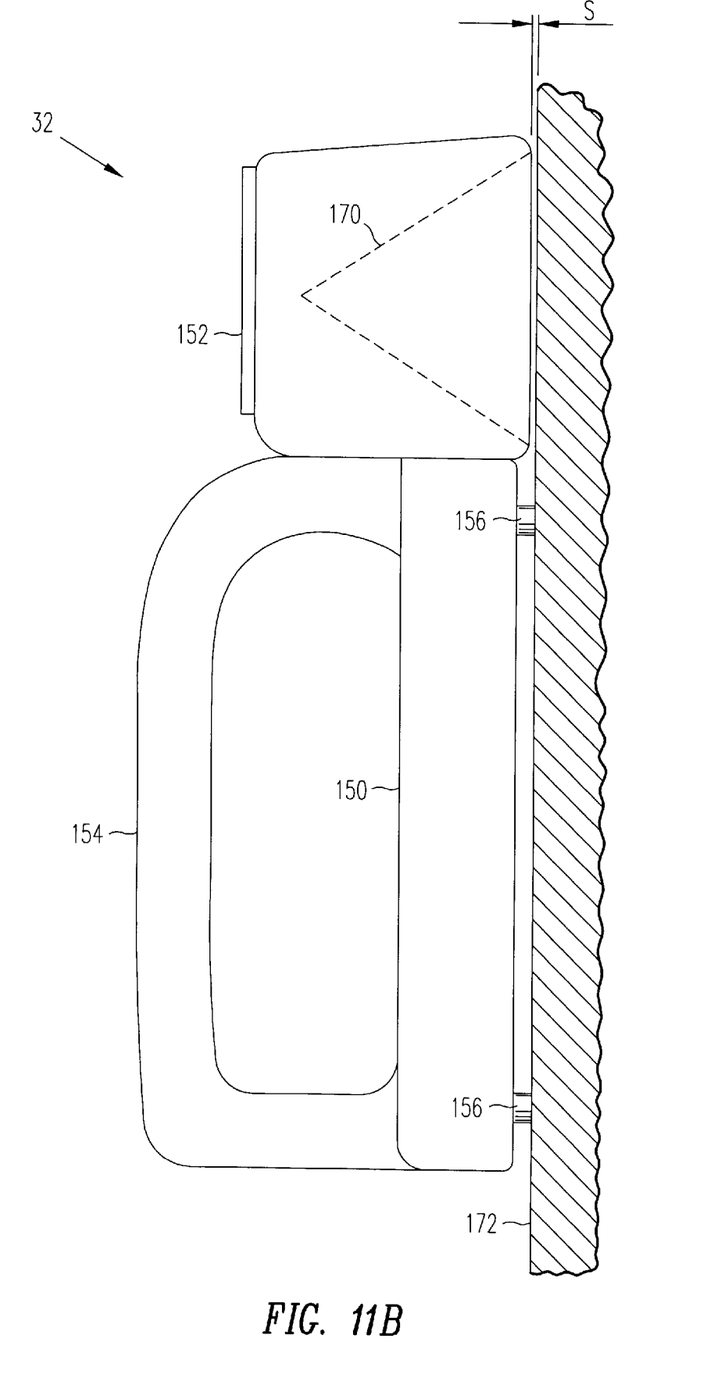

FIGS. 11A and 11B show a hand-held radar unit 32 in accordance with the present invention. Radar unit 32 includes a body 150, which in turn includes a display 152 and a handle 154.

Display 152 is similar to display 126 of FIGS. 10A and 10B, and includes a range scale 158 that indicates the range (e.g., depth) of a subsurface target in the way described above with respect to scale 136 of FIGS. 10A, 10B, and 10C. In FIG. 11A, display 152 graphically represents a scanned surface as a surface line 162. The long horizontal segments 160 along scale 158 each demark an inch of range from the scanned surface. For example, an icon 164 (shown at position one as icon $164_1$ and at position two as icon $164_2$) represents an object that is 5.5 inches below the surface.

Body 150 includes a handle 154 and wheels 156. In operation, a user grasps handle 154 and moves radar unit 32 laterally over a surface, the wheels 156 allowing radar unit 132 to glide easily over the surface. Assuming display 152 shows a subsurface object as icon $164_1$, the user may center radar unit 32 on the subsurface object by moving radar unit 32 to the left until the icon representing the subsurface object is located along scale 158, as illustrated by icon $164_2$.

FIG. 11B shows a side view of radar unit 32 positioned against a surface 170. Wheels 156 maintain an antenna spacing S between surface 170 and an antenna group 172 including, e.g., receive antenna 90 and transmit antennas A and B. In one embodiment, antenna spacing S is approximately 50 thousandths of an inch.

Receive antenna 90 and transmit antennas A and B may be any of a number of conventional broadband antennas, such as the monopole and circularly polarized antennas described in U.S. Pat. No. 5,543,795. Other appropriate broadband antennas are described in the related U.S. Pat. No. 5,640,168 incorporated herein by reference.

A system and method in accordance with the present invention is not limited to the particular applications described above, but has other applications for sensing of objects, not limited to the construction field. For example, the inventive display may advantageously be used to display distances in detection systems that use sonar or infrared, or that use spread spectrum, frequency-shift keying, or other conventional coding technologies. Therefore, the scope of the appended claims should not be limited to the description of the preferred versions described herein.

We claim:

1. A detection system adapted for sensing a target, the system comprising:

a first signal transmitter transmitting a first signal, wherein the first signal is reflected from the target to provide a first echo;

a second signal transmitter transmitting a second signal, wherein the second signal is reflected from the target to provide a second echo;

a signal receiver receiving the first and second echoes; and a display operatively connected to the receiver, the display showing along a first axis a first distance proportional to a transmit/echo path length between the first signal transmitter and the receiver and a second distance proportional to a second transmit/echo path length between the second signal transmitter and the receiver;

wherein the first signal is of a first phase and the first echo is of a second phase, and wherein the display provides an indication of whether the first echo is in phase with the first signal.

2. The system of claim 1, the display including a second axis along which is displayed a first symbol representing an amplitude of the first echo and a second symbol representing an amplitude of the second echo.

3. The system of claim 2, wherein the system is directly over the target when the first and second symbols are aligned along the first axis of the display.

4. The system of claim 3, the display further displaying an image of the distance and amplitude symmetrical about a center line of the display.

5. A detection system adapted for sensing a target, the system comprising:

a first transmitter transmitting a first signal, wherein the signal is reflected from the target to provide a first echo;

a second transmitter transmitting a second signal, wherein the second signal is reflected from the target to provide a second echo;

first signal receiver receiving a the first echo;

a second signal receiver receiving the second echo; and a display operatively connected to the first and second receivers, the display showing along a first axis a first distance proportional to a first transmit/echo path length between the first transmitter and the first receiver and a second distance proportional to a second transmit/echo path length between the second transmitter and the second receiver;

wherein the first signal is of a first phase and the first echo is of a second phase, and wherein the display provides an indication of whether the first echo is in phase with the first signal.

6. A hand-held radar detection system movable by hand across a surface to locate a target behind the surface, the system comprising:

at least three antennas arranged with respect to the target to define a first transmit/echo path of a first length and a second transmit/echo path of a second length;

a receiver connected to at least one of the at least three antennas, the receiver providing a first output corresponding to the first length and a second output corresponding to the second length; and a display operatively connected to the receiver, the display showing an icon along a first axis parallel to the surface, the display configured to move the icon along the first axis as the system is moved across the surface;

wherein the icon is displaced from a second axis perpendicular to the first axis by a distance proportional to the difference between the first and second lengths.

7. The system of claim 6, the display showing along the second axis a second distance proportional to a range between the system and the target.

8. The system of claim 6, wherein the receiver includes at least two receive antennas.

9. A hand-held detection system for locating a target within a solid volume, the system comprising:

means for moving the system over a surface of the volume;

means for defining a first transmit/echo path of a first length and a second transmit/echo path of a second length;

means for providing a first output corresponding to the first length and a second output corresponding to the second length; and means for displaying an icon along a first axis parallel to the surface, the display configured to move the icon along the first axis as the system is moved across the surface;

wherein the icon is displaced from a second axis perpendicular to the first axis by a distance approximately equal to an offset distance between a center line of the display means and a second line parallel to the center line and intersecting the target.

10. The system of claim 9, the means for displaying showing along a second axis a second distance proportional to a range between the system and the target.

11. The system of claim 1, wherein the display includes an icon having selected alternative first and second appearances, wherein the selected one of the first and second appearances provides the indication of whether the first echo is in phase with the first signal.

12. The system of claim 11, wherein the display depicts the icon as solid in the first appearance and as hollow in the second appearance.

13. The system of claim 12, wherein the icon is depicted as solid if the target is solid.

14. The system of claim 12, wherein the icon is depicted as hollow if the target is hollow.

15. The system of claim 6, wherein the first-mentioned distance is equal to an offset by which the target is displace from the second axis, such that the icon, when displayed, remains still relative to the target as the system is moved over the surface.

* * * * *